(12) United States Patent
Chen et al.

(10) Patent No.: US 10,108,243 B1
(45) Date of Patent: Oct. 23, 2018

(54) SMART USB PLUG DETECTION

(71) Applicant: Silego Technology, Inc., Santa Clara, CA (US)

(72) Inventors: Cheng-Hao Chen, Taipei (TW); Hyunbae Kim, Suwon (KR); Hyuntak Shin, Seongnam (KR)

(73) Assignee: Silego Technology, Inc., Santa Clara, CA (US)

( * ) Notice: Subject to any disclaimer, the term of this patent is extended or adjusted under 35 U.S.C. 154(b) by 384 days.

(21) Appl. No.: 14/017,211

(22) Filed: Sep. 3, 2013

Related U.S. Application Data

(60) Provisional application No. 61/696,057, filed on Aug. 31, 2012.

(51) Int. Cl.
  *G06F 1/26* (2006.01)
  *G06F 1/32* (2006.01)
(52) U.S. Cl.
  CPC ................. *G06F 1/3212* (2013.01)
(58) Field of Classification Search
  CPC ....... G06F 1/266; G06F 1/3206; G06F 1/3212
  See application file for complete search history.

(56) References Cited

U.S. PATENT DOCUMENTS

| | | | | |
|---|---|---|---|---|
| 2005/0110428 A1* | 5/2005 | Crandall | ............ | H05B 41/3927 315/224 |
| 2007/0260905 A1* | 11/2007 | Marsden | ............... | G06F 1/3215 713/323 |
| 2008/0259514 A1* | 10/2008 | Cagno | .................... | H02H 9/004 361/93.7 |
| 2009/0271644 A1* | 10/2009 | Fiebrich | ................ | G06F 1/3203 713/320 |
| 2010/0280676 A1* | 11/2010 | Pabon | ..................... | G06F 1/266 700/295 |
| 2011/0087805 A1* | 4/2011 | Liu | ...................... | G06F 13/4081 710/14 |
| 2011/0264942 A1* | 10/2011 | Tsukamoto | ............. | G06F 1/266 713/324 |
| 2012/0117280 A1* | 5/2012 | Ballot | ................... | G06F 13/385 710/17 |
| 2012/0190193 A1* | 7/2012 | Shau | ................. | H01L 21/76898 438/667 |
| 2013/0127402 A1* | 5/2013 | Pulijala | ................. | H02J 7/0009 320/107 |

* cited by examiner

*Primary Examiner* — Thomas Lee
*Assistant Examiner* — Vincent Chang
(74) *Attorney, Agent, or Firm* — Van Pelt, Yi & James LLP

(57) ABSTRACT

Smart USB plug detection is disclosed. In some embodiments, a battery charger identification chip includes circuitry configured to determine whether an external USB device has been plugged into a USB port of an associated system while the system is in a sleep mode and includes a pin configured to output a control signal indicating whether an external USB device is plugged into the system, wherein when an external USB device is plugged into the system the control signal facilitates powering on a current limit switch that is otherwise powered off during the sleep mode and wherein the current limit switch facilitates regulated delivery of current to the plugged in external USB device.

34 Claims, 6 Drawing Sheets

| Pin # | Pin Name | Type | Pin Description |
|---|---|---|---|
| 1 | CEN# | Output | P-FET Open Drain Output. Current Limit Switch (CLS) Control Output. CB changes from 0 to 1 or 1 to 0. CEN# will be high for 2 seconds (typ) |
| 2 | DM | Input/Output | USB Connector D- |
| 3 | DP | Input/Output | USB Connector D+ |
| 4 | SUPD | Input/Output | Smart USB plug in detection in S5 (CB=0, USB connector VBUS=0V) SPGEN = 0, SUPD = Hi-Z. SPGEN = 1, SUPD detects if USB is plugged in or not. |
| 5 | SPGEN | Input | Smart Plug in detection function enable in S5. 0 = Disable SUPD function. 1 = Enable SUPD function. |
| 6 | SPG# | Output | USB device plug in detection output in S5. (Needs external pull-up) SPGEN = 0, SPG# = 1. SPGEN = 1, SPG# = 1, after any device is plugged into USB then SPG# becomes 0. |
| 7 | VDD | PWR | Power Supply. Connect a 0.1µF capacitor between VDD and GND as close as possible to the device. |
| 8 | TDP | Input/Output | Host USB Transceiver D+ Connection |
| 9 | TDM | Input/Output | Host USB Transceiver D- Connection |
| 10 | CB | Input | Switch Control Bit 0 = autodetection charger identification active 1 = charging downstream port with active USB2.0 data communication mode with 1.5A support |
| 11 | Thermal Pad | GND | Ground |

FIG. 4A

| Pin # | Pin Name | Type | Pin Description |
|---|---|---|---|
| 1 | CEN | Output | N-FET Open Drain output. Current Limit Switch (CLS) Control Output. CB changes from 0 to 1 or 1 to 0. CEN will be high for 2 seconds (typ) |
| 2 | DM | Input/Output | USB Connector D- |
| 3 | DP | Input/Output | USB Connector D+ |
| 4 | SUPD | Input/Output | Smart USB plug in detection in S5 (CB=0, USB connector VBUS=0V) SPGEN = 0, SUPD = Hi-Z. SPGEN = 1, SUPD detects if USB is plugged in or not. |
| 5 | SPGEN | Input | Smart Plug in detection function enable in S5. 0 = Disable SUPD function. 1 = Enable SUPD function. |
| 6 | SPG# | Output | USB device plug in detection output in S5. (Needs external pull-up) SPGEN = 0, SPG# = 1. SPGEN = 1, SPG# = 1, after any device is plugged into USB then SPG# becomes 0 |
| 7 | VDD | PWR | Power Supply. Connect a 0.1µF capacitor between VDD and GND as close as possible to the device. |
| 8 | TDP | Input/Output | Host USB Transceiver D+ Connection |
| 9 | TDM | Input/Output | Host USB Transceiver D- Connection |
| 10 | CB | Input | Switch Control Bit 0 = autodetection charger identification active 1 = charging downstream port with active USB2.0 data communication mode with 1.5A support |
| 11 | Thermal Pad | GND | Ground |

SMART USB PLUG DETECTION

CROSS REFERENCE TO OTHER APPLICATIONS

This application claims priority to U.S. Provisional Patent Application No. 61/696,057 entitled SMART USB PLUG DETECTION filed Aug. 31, 2012 which is incorporated herein by reference for all purposes.

BACKGROUND OF THE INVENTION

A system supporting USB charge functionality typically requires an associated battery charger identification chip and current limit switch to always or continuously be powered on, which contribute to system power consumption and reduced system battery life.

BRIEF DESCRIPTION OF THE DRAWINGS

Various embodiments of the invention are disclosed in the following detailed description and the accompanying drawings.

FIGS. 4A-4B are each a table specifying pin assignments of embodiments of a BCID chip.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

USB (Universal Serial Bus) ports have become ubiquitous in modern computing systems for interfacing with various external devices. Moreover, USB ports are now prevalently used as charging ports. Techniques for smart USB plug detection are disclosed herein that result in reduced system power consumption and consequent extended system battery life which are especially useful when accommodating charging of an external USB device while a system is in a (deep) sleep mode.

Figure 1:
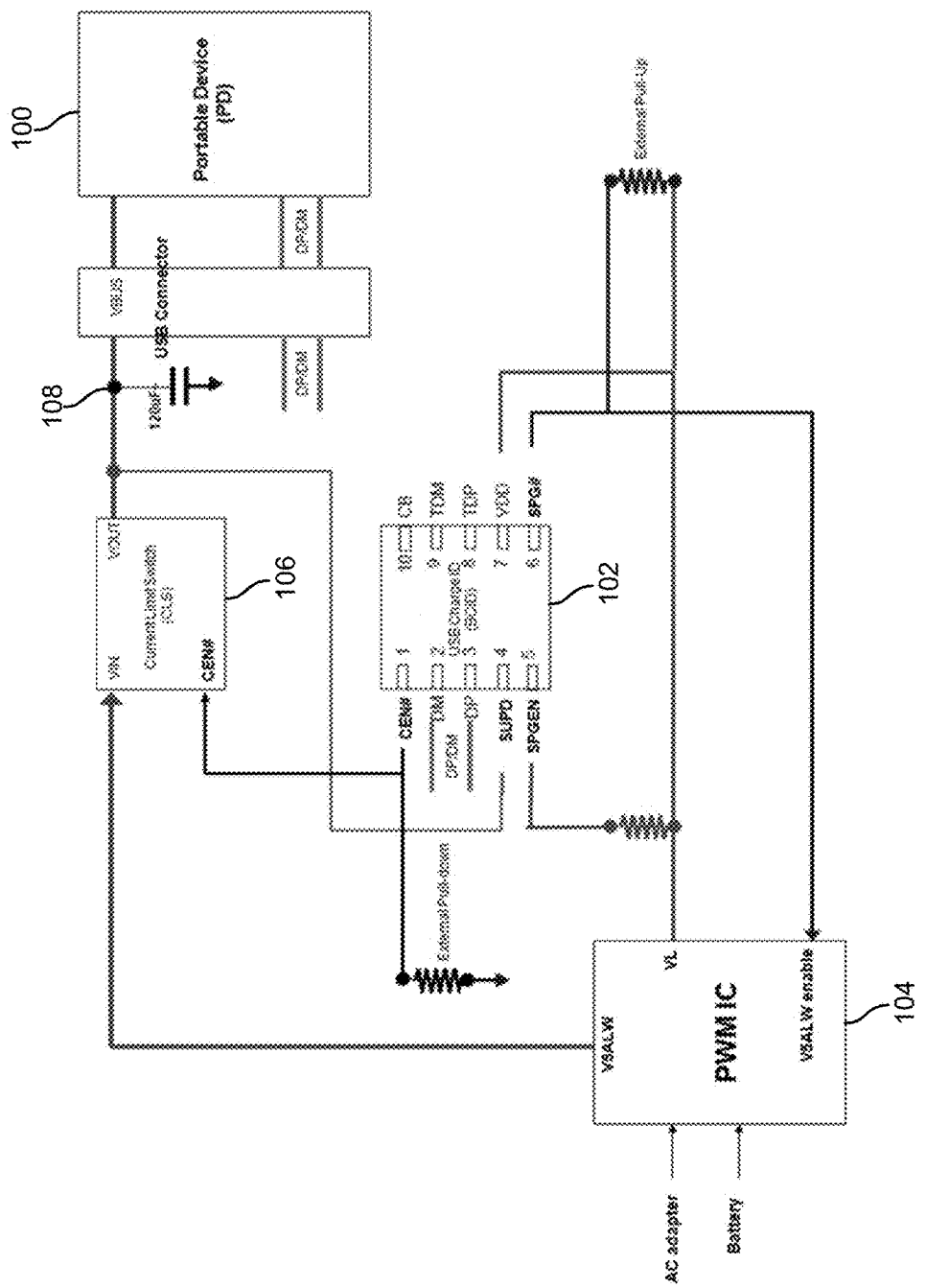
FIG. 1 is a high level block diagram illustrating an embodiment of system components associated with facilitating charging of an external USB device.

FIG. 1 is a high level block diagram illustrating an embodiment of system components associated with facilitating charging of an external USB device. The system may comprise any system that includes a USB port via which an external USB device 100 may be connected and charged. For example, the system may comprise a notebook computer and external USB device 100 may comprise a mobile phone connected for battery charging. Power or current requirements of the external USB device 100 plugged into a USB port of the system are determined by BCID (Battery Charger Identification) chip 102. PWM IC (Pulse Width Modulator Integrated Circuit) 104 controls CLS (Current Limit Switch) 106, which supplies a regulated current to external USB device 100.

In some embodiments, CLS 106 is powered off during a sleep mode of the system to conserve power and only powered on when external USB device 100 is connected. In some such cases, BCID chip 102 is configured to detect plug-in of external USB device 100 and facilitate powering-on of CLS 106 so that requisite current can be delivered to external USB device 100 when it is connected to the system and likewise facilitate powering-off of CLS 106 when external USB device 100 is disconnected. Specifically, a dedicated pin (SUPD) of BCID chip 102 is employed to monitor Vbus 108 current/voltage. Perturbations in Vbus 108 current/voltage are detected and used to determine when an external USB device is plugged into or out of the system. BCID chip 102 outputs one or more control signals, which may be employed by PWM IC 104, to power-on and power-off CLS 106 as applicable. Shutting down CLS 106 when no external USB device is connected is useful for conserving system power and extending system battery life especially during deep sleep modes, such as when the system is in an S5 sleep state. Further power savings may be achieved by operating BCID chip 102 in a low power, standby mode. For example, BCID chip 102 or at least one or more components thereof may be pulse powered on to periodically (instead of continuously) check whether an external USB device is plugged into a USB port of the system.

Figure 2:
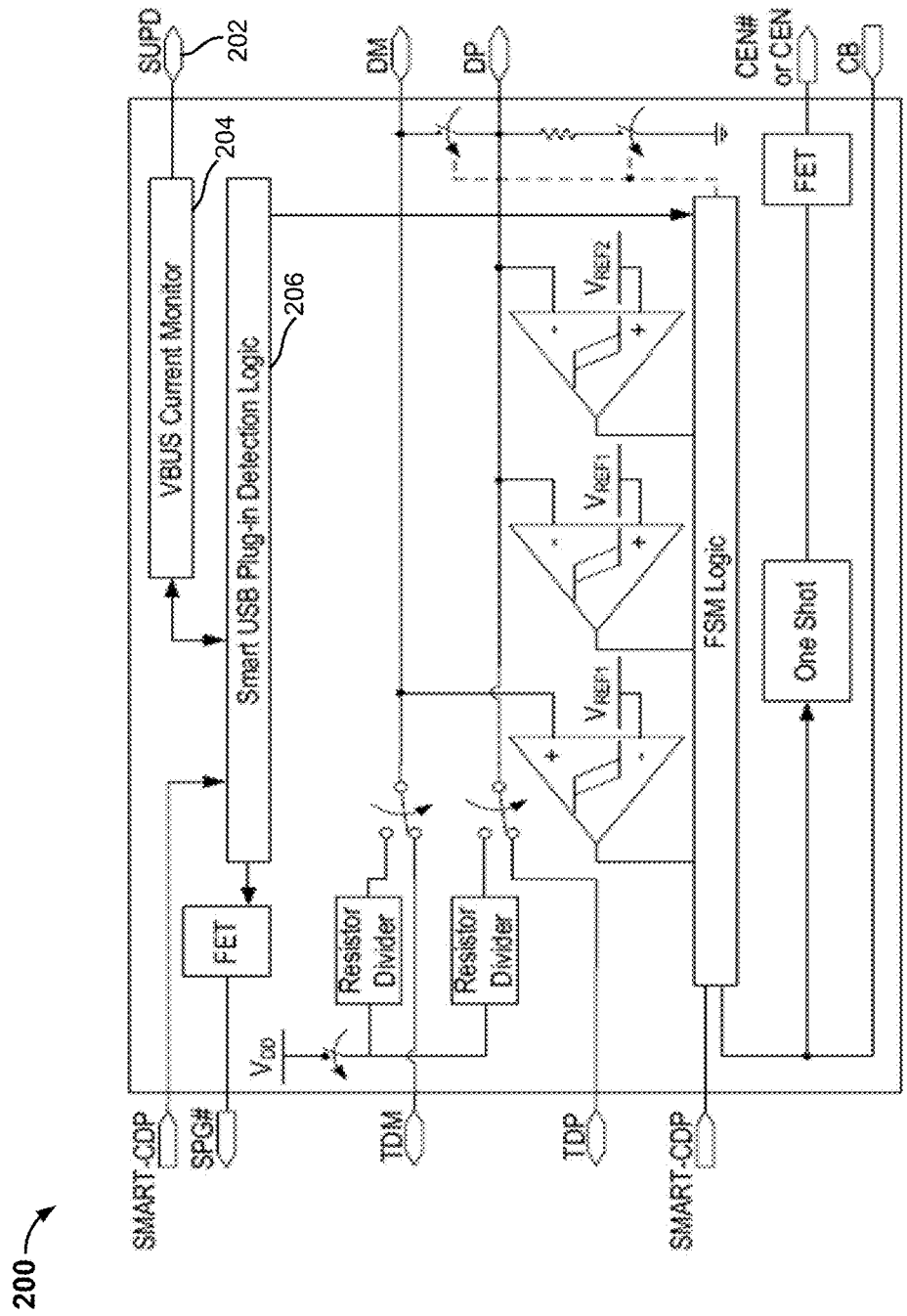
FIG. 2 is a high level circuit diagram illustrating an embodiment of a BCID chip.

FIG. 2 is a high level circuit diagram illustrating an embodiment of a BCID chip. For example, circuit 200 comprises BCID chip 102 of FIG. 1. As depicted, a dedicated pin (SUPD) 202 is employed to monitor Vbus 204 current/voltage, and circuit 200 further comprises logic 206 for smart USB plug-in detection.

Figure 3:
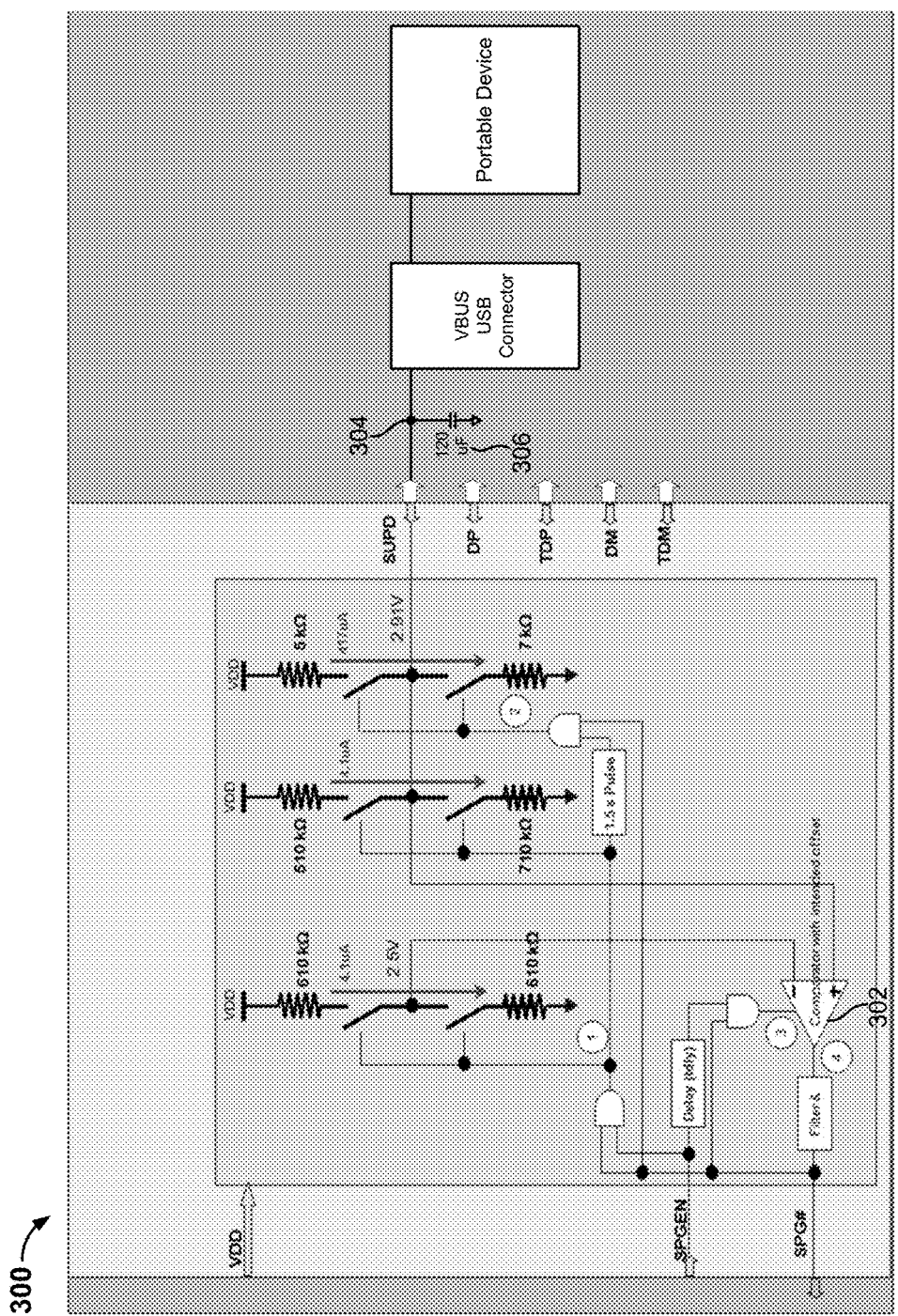
FIG. 3 is a high level circuit diagram illustrating an embodiment of logic comprising a BCID chip.

FIG. 3 is a high level circuit diagram illustrating an embodiment of logic comprising a BCID chip. For example, logic 300 comprises at least a portion of logic 206 of circuit 200 of FIG. 2. As depicted, logic 300 comprises a comparator 302 that detects Vbus 304 current/voltage changes. Specifically, comparator 302 compares Vbus 304 current/voltage to a reference value to determine whether an external USB device is plugged into the system. In this embodiment, capacitor 306 is charged when no external USB device is plugged into the system and discharged (i.e., effectively ground) when an external USB device is plugged into the system and begins drawing current via the pre-charge existing on capacitor 306. Based on the comparison, a control signal is output by the BCID chip indicating whether an external USB device is plugged into the system or not. The control signal facilitates (e.g., via an associated PWM IC) powering-on a corresponding current limit switch for regulated delivery of current when an external USB device is detected and powering-off the current limit switch when an external USB device is not detected.

Figure 5A:
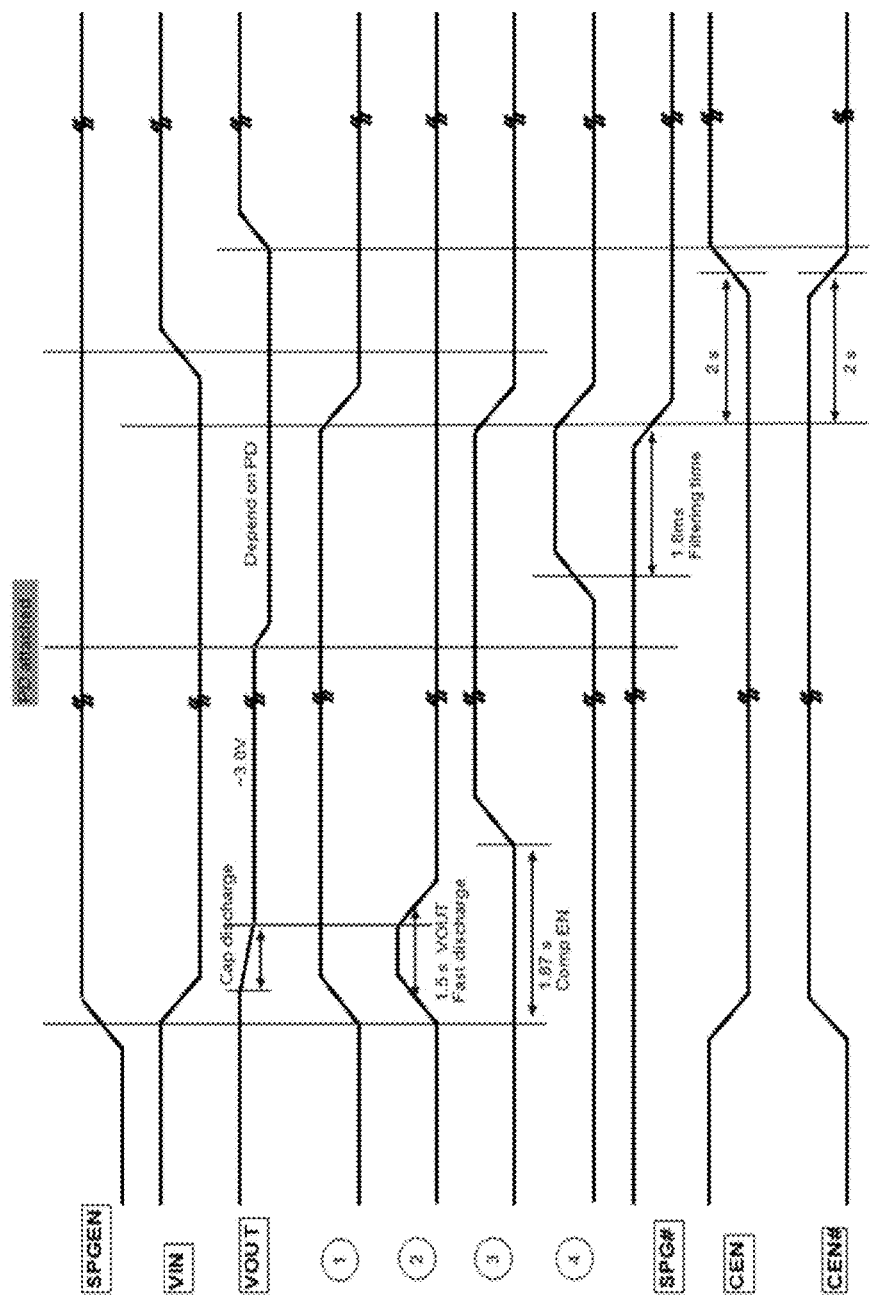
FIGS. 5A-5B are each a timing diagram of various signals associated with embodiments of a BCID chip.
Figure 5B:
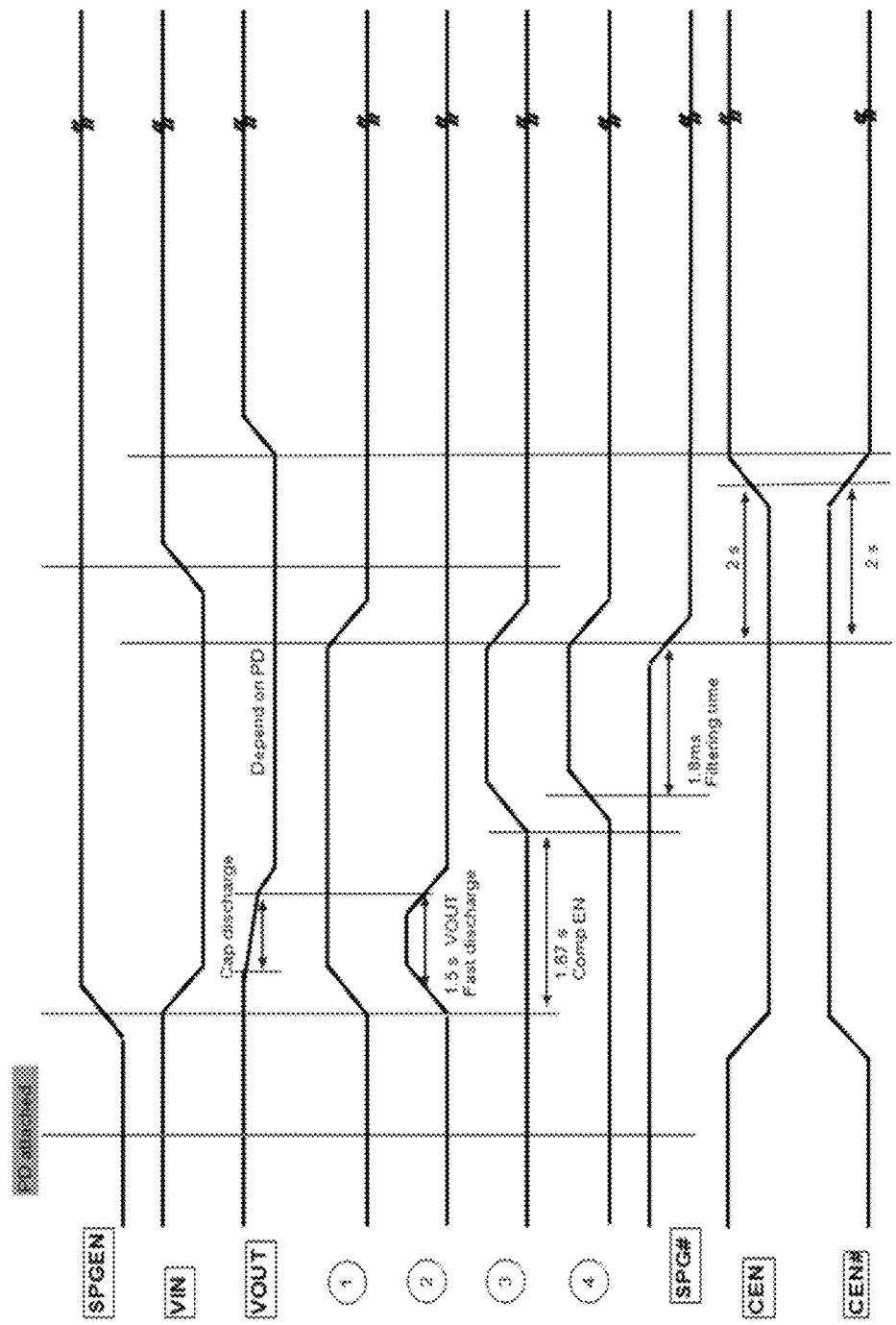

FIGS. 4A-4B are each a table specifying pin assignments of embodiments of a BCID chip. FIGS. 5A-5B are each a timing diagram of various signals associated with embodiments of a BCID chip. For example, the pin descriptions and timing diagrams of FIGS. 4-5 correspond to the BCID chip of FIGS. 1-3.

The disclosed BCID chip supports existing USB port architectures and is compatible with USB Battery Charging Specification standards. In various embodiments, the BCID chip supports CDP (Charging Downstream Port) mode and/or low/full speed mouse/keyboard wake-up from S3 mode. In some embodiments, the BCID chip comprises an integrated circuit having, for example, a TDFN (Thin Dual Flat No Leads) package.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An integrated circuit, comprising:
   an input pin;
   a comparator configured to compare a value on the input pin with a reference when the integrated circuit is pulse powered on to determine whether an external USB (Universal Serial Bus) device has been plugged into a USB port of an associated system while the system is in an S5 sleep state; and
   an output pin configured to output a control signal indicating when the external USB device is plugged into the system, wherein when the external USB device is plugged into the system the control signal facilitates powering on a current limit switch that is otherwise powered off during the S5 sleep state and wherein the current limit switch facilitates regulated delivery of current to the plugged in external USB device.

2. The integrated circuit of claim 1, wherein the value of the input pin is effectively ground when the external USB device is plugged into the system.

3. The integrated circuit of claim 1, wherein the input pin is connected to the USB port Vbus.

4. The integrated circuit of claim 1, wherein the input pin is connected to a capacitor that is charged when no external USB device is plugged into the system and discharged when the external USB device is plugged into the system.

5. The integrated circuit of claim 4, wherein the external USB device plugged into the system begins drawing current via a pre-charge existing on the capacitor.

6. The integrated circuit of claim 1, wherein the integrated circuit is pulse powered on instead of continuously on to periodically check whether the external USB device is plugged into or out of the system to reduce power consumption.

7. The integrated circuit of claim 1, wherein when the external USB device is not plugged into the system the control signal facilitates powering off the current limit switch.

8. The integrated circuit of claim 1, wherein the control signal is provided to a pulse width modulator integrated circuit configured to control the current limit switch.

9. The integrated circuit of claim 1, wherein the integrated circuit operates in a low power, standby state while in the S5 sleep state.

10. The integrated circuit of claim 1, wherein the integrated circuit supports a standard USB port.

11. The integrated circuit of claim 1, wherein the integrated circuit supports USB Battery Charging Specification standards.

12. The integrated circuit of claim 1, wherein the integrated circuit supports CDP (Charging Downstream Port) mode.

13. The integrated circuit of claim 1, wherein the integrated circuit supports low/full speed mouse/keyboard wake-up from S3 mode.

14. The integrated circuit of claim 1, wherein the integrated circuit comprises a battery charger identification chip.

15. The integrated circuit of claim 1, wherein the integrated circuit comprises a TDFN (Thin Dual Flat No Leads) package.

16. The integrated circuit of claim 1, wherein the system comprises a notebook computer.

17. The integrated circuit of claim 1, wherein the external USB device comprises a mobile phone.

18. A method, comprising:
    configuring a comparator of an integrated circuit to compare a value of an input pin of the integrated circuit with a reference when the integrated circuit is pulse powered on to determine whether an external USB (Universal Serial Bus) device has been plugged into a USB port of an associated system while the system is in an S5 sleep state; and
    configuring an output pin of the integrated circuit to output a control signal indicating when the external USB device is plugged into the system, wherein when the external USB device is plugged into the system the control signal facilitates powering on a current limit switch that is otherwise powered off during the S5 sleep state and wherein the current limit switch facilitates regulated delivery of current to the plugged in external USB device.

19. The method of claim 18, wherein the value of the input pin is effectively ground when the external USB device is plugged into the system.

20. The method of claim 18, wherein the input pin is connected to the USB port Vbus.

21. The method of claim 18, wherein the input pin is connected to a capacitor that is charged when no external USB device is plugged into the system and discharged when the external USB device is plugged into the system.

22. The method of claim 21, wherein the external USB device plugged into the system begins drawing current via a pre-charge existing on the capacitor.

23. The method of claim 18, wherein the integrated circuit is pulse powered on instead of continuously on to periodically check whether the external USB device is plugged into or out of the system to reduce power consumption.

24. The method of claim 18, wherein when the external USB device is not plugged into the system the control signal facilitates powering off the current limit switch.

25. The method of claim 18, wherein the control signal is provided to a pulse width modulator integrated circuit configured to control the current limit switch.

26. The method of claim 18, wherein the integrated circuit operates in a low power, standby state while in the S5 sleep state.

27. The method of claim 18, wherein the integrated circuit supports a standard USB port.

28. The method of claim 18, wherein the integrated circuit supports USB Battery Charging Specification standards.

29. The method of claim 18, wherein the integrated circuit supports CDP (Charging Downstream Port) mode.

30. The method of claim 18, wherein the integrated circuit supports low/full speed mouse/keyboard wake-up from S3 mode.

31. The method of claim 18, wherein the integrated circuit comprises a battery charger identification chip.

32. The method of claim 18, wherein the integrated circuit comprises a TDFN (Thin Dual Flat No Leads) package.

33. The method of claim 18, wherein the system comprises a notebook computer.

34. The method of claim 18, wherein the external USB device comprises a mobile phone.

\* \* \* \* \*